Oct. 1, 1957 N. F. ANDREWS 2,807,925
PNEUMATIC CONVEYING AND SEPARATING MEANS FOR COTTON HARVESTERS
Filed Oct. 20, 1955
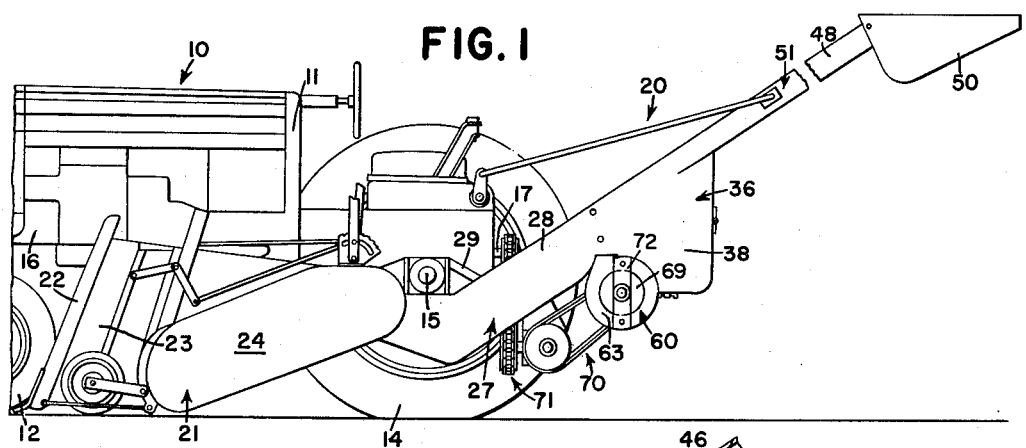
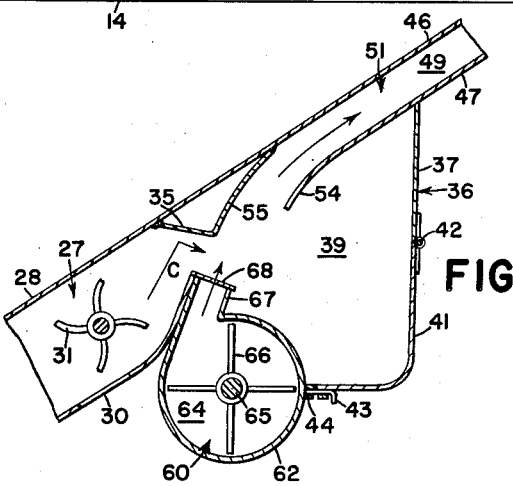
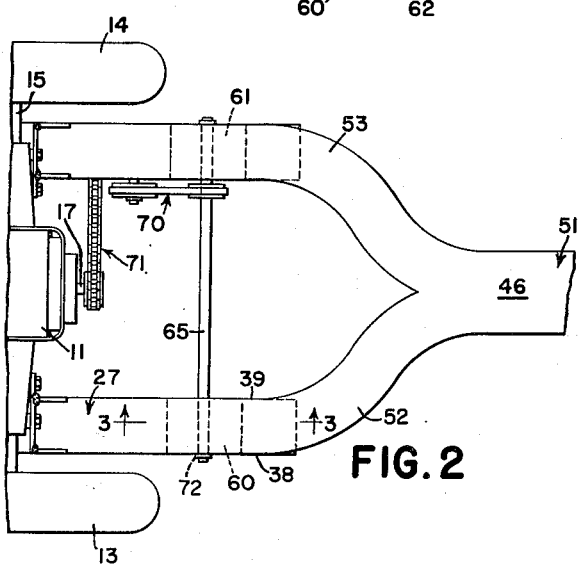
INVENTOR.
N. F. ANDREWS United States Patent Office 2,807,925
Patented Oct. 1, 1957

2,807,925

PNEUMATIC CONVEYING AND SEPARATING MEANS FOR COTTON HARVESTERS

Norman F. Andrews, Des Moines, Iowa, assignor to Deere Manufacturing Co., Dubuque, Iowa, a corporation of Iowa Application October 20, 1955, Serial No. 541,596

8 Claims. (Cl. 56—12)

This invention relates to a cotton harvester adapted to be mounted on a tractor and to move forwardly over a field of row-planted cotton plants and to indiscriminately and forcibly pick ripe and green cotton bolls from the plants passing through the harvester. More particularly, this invention relates to a separating and elevating means for elevating the commingled ripe and green bolls picked by the harvesting unit to an awaiting receptacle and for separating the ripe from the green bolls prior to their collection in the receptacle.

A conventional type of cotton stripper now available is one adapted to be mounted on a tractor having a centrally positioned and elongated tractor body carried on steerable front wheels and on a rear axle supported on transversely spaced rear wheels spaced laterally from the tractor body to provide harvester-mounting spaces between the tractor body and the rear wheels. A pair of cotton picking or stripping units is mounted in longitudinal alinement with the aforesaid spaces and extend forwardly from the rear axle to successively strip or to forcibly detach the cotton bolls from plants in adjacent rows of cotton as they pass under or through the cotton harvesting unit. Directly rearwardly of the stripping or picking units is provided a pair of cleaning units which receive the commingled ripe and green bolls from the harvesting unit and direct them rearwardly while at the same time processing or cleaning foreign matter from the bolls. In the present conventional type of cotton harvester the cotton bolls are then dispatched in a rearwardly extending discharge elevator which moves the bolls to a trailing receptacle. While in some instances there is an attempt to separate the ripe from the green bolls at the discharge end of the elevator, separation must normally be done after the commingled bolls are received in the trailing receptacle. This latter procedure of course is considerably expensive as well as time consuming.

It is therefore the object of this invention to provide with the above described type of picking or stripping and cleaning or treating unit, a material discharge elevator which is simple to operate, is of simpler design than anything presently available, requires a minimum of maintenance and repair, and reduces the initial cost of construction.

It is also an object of this invention to provide with a cotton harvester of the above type a separating unit which will collect the green bolls issuing from the cleaning unit and will dispatch only the ripe bolls through the discharge elevator and into the awaiting receptacle. This will permit an automatic separation between the ripe and green bolls whereas in the prior system separation had to occur, usually manually, after the commingled bolls were in the receptacle or at a suitable location where the commingled bolls were dumped.

Other objects and advantages of the invention will become apparent to those skilled in the art as the nature of the invention is better understood from the following detailed description illustrated in the accompanying drawings.

Fig. 1 is a fragmentary side elevation of portions of a tractor and a cotton harvester incorporating the principles of the present invention. The left rear wheel of the tractor is removed to more clearly show the features of the cotton harvester.

Fig. 2 is a plan view of the rear portion of a tractor and the harvester including the cleaning units and the forward portion of the discharge elevator.

Fig. 3 is an enlarged sectional view taken along the line 3—3 of Fig. 2.

A tractor, indicated in its entirety by the reference numeral 10, comprises a narrow longitudinally and centrally positioned body 11 supported at its forward end on a front steerable wheel assembly 12 and at its rear end by two laterally spaced rear wheels 13, 14 which are mounted on a transverse axle 15. A main frame 16 extends from front to rear and carries the tractor body 11. The wheels 13, 14 are spaced transversely from the tractor body 11 thereby providing left and right hand spaces at which a two-row cotton harvester 20 may be positioned for mounting on the tractor. The tractor is provided with a conventional power take-off shaft 17 extending from the rear of the tractor body 11.

Many features of the cotton harvester 20 are conventional and will be described for present purposes not in detail but only generally. The harvester comprises left and right hand and forwardly extending stripping or picking units, the left hand stripping unit 21 being the only one shown. The stripping unit 21 includes at its forward end the plant receiving hood 22 which is arched to pass over the rows of plants passing through the unit. Extending rearwardly from the vertical portion of the hood 22 are two side panels 23 that guide the plants into the stripping or intermediate portion of the picking unit. The stripping portion is cased in a housing 24 and has the conventional type of stripping bar and stripping roll, not shown, which operate to forcibly detach both ripe and green cotton bolls from the plants as they pass through the harvester. Incorporated in the stripping units are means for moving the picked or stripped cotton rearwardly to a cleaning or cotton treating unit 27 cased in a cleaning unit housing 28 and which is supported on the tractor axle 15 by suitable framework 29. The cleaning unit 27 is also conventional, containing a plurality of rotatable cleaning devices in the form of rows of rotatable fingers which engage the cotton bolls received from the stripping unit 21 and drives them upwardly and rearwardly over a grate 30 through which dirt, gravel, and other foreign matter loosened from the cotton bolls will gravitate. The cleaning unit 27 therefore serves not only as a means for cleaning the cotton bolls but also serves as means for conveying the commingled ripe and green bolls rearwardly. While only the left hand harvesting unit has been described it should be recognized that the right hand harvesting unit, with the obvious exceptions, is similar to the left hand harvesting unit. Also, specific details of the gathering and stripping units as well as the cleaning units including the corresponding drive means was not described in detail inasmuch as previously mentioned they are conventional. However, if a more complete description is desired, such is available in U. S. Patent 2,533,510.

Cotton bolls are driven from the cleaning unit 27 in a stream of commingled ripe and green bolls directed rearwardly and slightly upwardly as indicated by the arrow C where they are deflected downwardly and rearwardly by a deflector 35, fixed to the cleaning unit housing 28, in the direction of a cotton boll receiving container 36 mounted at the rear of the cleaning unit 27. The container 36 comprises a rear vertical panel 37 fixed as by welding or other suitable means to a lower surface of an elevator housing, later to be described in detail, and connected at its left and right edges by respective vertically disposed side panels 38, 39 which are a continuation, as shown in Fig. 1, of the side panels of the cleaning unit housing 28. Also forming part of the container is a bottom closure or gate member 41 which is hingedly connected as at 42 to the vertically disposed rear plate 37 and when in its closed position, as shown in Figs. 1 and 2, serve as the bottom plate or panel of the container 36. At the forward edge of the closure member 41 is a latch 43 which is adapted to be received in a latch receviing member 44 fixed to the rearward surface of a blower housing 62, also to be later explained in detail, for locking the member 41 in its closed position. The obvious purpose of hingedly mounting the closure member 41 is, of course, to provide a means for releasing the cotton bolls collected in the container 36.

Housing means, comprising upper and lower laterally disposed panels 46, 47 connected at their outer edges by vertical side plates 48, 49, form an air passage or duct 51 which serves as a passage for conveying the cotton bolls upwardly and rearwardly from the cleaning unit to a trailing receptacle. The air passage has an outlet end remote from the harvester, and is provided at that end with a deflecting unit 50 which serves to direct the cotton bolls issuing from the elevator into the receptacle. The elevator housing forming the air passage 51 is bifurcated at its lower end to form two diverging air passages 52, 53, which extend to the respective left and right hand sides of the tractor to be in fore-and-aft alinement with the respective cleaning or treating units 27 on the tractor. Viewing Fig. 3, the lower end of the bottom panel 47 of the elevator housing is turned downwardly as at 54 and operates in conjunction with a curved plate 55, which is integral with the deflector plate 35 and which is spaced upwardly and forwardly from the portion 54, to cause the air passage 52, to be turned downwardly at its forward or inlet end. A similar construction, while not shown, is provided in the right air passage 53.

Left and right hand blower means 60, 61, respectively, are mounted under the rear portion of the treating units on each side of the tractor body. The blower means 60, 61 serve to direct blasts of air into the respective air ducts or passages 52, 53. The blower means comprises, again limiting the description to that existing on the left hand of the picker, a cylindrical shaped housing member 62 which has its end edges connected by vertically disposed circular plates 63, 64, extending downwardly in substantially vertical alinement with the side panels 38, 39. An air inlet 69 is provided in the side plate 63 and a bracket 72 extends across the inlet 69 to support one end of a blower drive shaft 65 on which is fixed fan blades 66. The opposite end of the shaft 65 is journaled to the side panel 64. The blower means operates to drive a blast of air through a short duct or outlet 67, which is also formed by the blower housing, for directing the blast of air toward the inlet end of the air passage 52. A grate 68 is mounted over the outlet 67 to prevent heavy material from entering the blower housing.

The shaft 65 extends transversely across and through both the blower means 60 and 61, thereby providing a single drive shaft for both the blowers. The drive shaft 65 is driven by a V-belt drive, indicated in its entirety by the reference numeral 70 which in turn receives its power from the power take-off shaft 17 of the tractor through a sprocket and chain drive 71 and a suitable gear transmission, not shown.

The separating means and discharge elevator operate in the following manner. The mixture of commingled ripe and green bolls will be driven from the left hand cleaning or cotton treating unit 27 in a stream indicated by the arrow C and will deflect off of the deflector 35, also as indicated by the arrow C, to traverse the blast of air leaving the blower 60. The blast of air is of sufficient intensity to drive the ripe bolls, which are considerably lighter than the green bolls, from the stream of material upwardly and rearwardly through the air passage 52 and ultimately through the air passage 51 to be discharged at the outlet of the elevator. The green bolls will continue in the original stream to be collected in the left hand container 36 which may be emptied either at the end of the row or other suitable place. A similar action will occur at the corresponding right hand members of the harvesting unit.

While the preferred form of the invention has been shown it should be recognized that other forms and variations could exist without departing basically from the broad general principles herein disclosed. It should therefore be understood that while the preferred form has been described with the view of clearly and concisely illustrating the principles of the invention it is desired not to so limit or narrow the invention beyond that which is claimed.

What is claimed is:

1. On a cotton harvester having a frame and a harvesting unit on the frame for indiscriminately and forcibly detaching ripe and green cotton bolls from cotton plants and including means for conveying the cotton bolls to a discharge portion of the harvesting unit and to depart therefrom in a stream of a commingled mixture of ripe and green bolls, the improvement residing in means for separating and distributing the respective ripe and green bolls comprising: housing means supported by the harvesting unit and forming an elongated air passage having an outlet remote from the discharge portion of the harvesting unit and an inlet proximate to the discharge portion of the harvesting unit; a boll-receiving receptacle connected to the harvesting unit and positioned to receive cotton bolls issuing from the stream; and blower means supported by the harvesting unit directing a blast of air through the air passage and traversing the stream of cotton bolls, the blast of air being of sufficient intensity to drive the ripe bolls from the stream and through the air passage to be discharged at the outlet and to permit the green bolls to continue in the direction of the stream.

2. On a cotton harvester having a frame and a harvesting unit on the frame having means for indiscriminately and forcibly detaching ripe and green cotton bolls from cotton plants and including means for conveying the cotton bolls to a discharge portion of the harvesting unit and to depart therefrom in a stream of a commingled mixture of ripe and green bolls, the improvement residing in means for separating and distributing the respective ripe and green bolls comprising: housing means supported by the harvesting unit forming a rearwardly and upwardly extending elongated air passage having a rear discharge outlet remote from the discharge portion of the harvesting unit and a forward inlet proximate to the discharge portion of the harvesting unit; a boll-receiving receptacle connected to the harvesting unit and positioned to receive cotton bolls issuing from the stream; blower means on the harvesting unit directing a blast of air through the air passage and traversing the stream of cotton bolls, the blast of air being of sufficient intensity to drive the ripe bolls from the stream and through the air passage to be discharged at the outlet and to permit the green bolls to continue in the direction of the stream.

3. Cotton conveying and separating means for a cotton harvester adapted to be mounted on a tractor to move over a field of row-planted cotton plants, the cotton harvester including a pair of harvesting units mounted on opposite sides of the tractor and having means therein for indiscriminately and forcibly detaching ripe and green cotton bolls from adjacent rows of cotton plants and conveying the detached bolls rearwardly to respective discharge portions of the harvesting units to depart therefrom in streams of commingled ripe and green cotton bolls; said cotton conveying and separating means comprising: boll receiving-container means adjacent to and connected to the discharge portions of the harvesting units and positioned to receive cotton bolls issuing from the streams; structure supported by the tractor and forming air passages having inlets proximate to the respective left and right hand discharge portions and an outlet remote from the discharge portions; blower means fixed to the structure directing blasts of air toward said inlets and traversing the respective streams of commingled cotton bolls, the blasts of air being of sufficient intensity to drive the ripe bolls from the streams and through the passages to be discharged through the outlet and to permit the green bolls to continue in the streams for ultimate collection in the container means.

4. Cotton conveying and separating means for a cotton harvester adapted to be mounted on a tractor to move over a field of row-planted cotton plants, the cotton harvester including a pair of harvesting units mounted on opposite sides of the tractor and having means therein for indiscriminately and forcibly detaching ripe and green cotton bolls from adjacent rows of cotton plants and conveying the detached bolls rearwardly to respective discharge portions of the harvesting units to depart therefrom in streams of commingled ripe and green cotton bolls, said conveying and separating means comprising: boll-receiving container means supported by the tractor adjacent to the discharge portions of the harvesting units and positioned to receive cotton bolls issuing from the streams; housing means connected to the harvesting units and forming air passages including a fore-and-aft extending elongated passage in longitudinal alinement with the tractor body and having a rear discharge outlet remote from the discharge portion of the harvesting units and a pair of forwardly diverging air passages extending outwardly from the forward end of the elongated passage to respective left and right passage inlets proximate to the respective discharge portions of the harvesting units; blower means connected to the harvesting units directing blasts of air through said inlets, the blasts of air traversing the respective streams of commingled cotton bolls and being of sufficient intensity to drive the ripe bolls from the streams and through the passages to be discharged at the outlet and to permit the green bolls to continue in the streams for ultimate collection in the container means.

5. Cotton conveying and separating means for a cotton harvester adapted to be mounted on a tractor to move over a field of row-planted cotton plants, the cotton harvester comprising: a pair of harvesting units mounted on opposite sides of the tractor and having means therein for indiscriminately and forcibly detaching ripe and green cotton bolls from adjacent rows of cotton plants and including means therein for conveying the detached bolls to respective discharge portions of the harvesting units to depart therefrom in streams of commingled ripe and green cotton bolls, said conveying and separating means comprising: boll-receiving container means adjacent to and rigid with the discharge portions of the harvesting units and positioned to receive cotton bolls issuing from the streams; housing means rigidly connected to the harvesting units and forming air passages including a fore-and-aft extending elongated central passage in longitudinal alinement with the tractor body and having a rear discharge outlet remote from the discharge portions of the harvesting units and a pair of forwardly diverging air passages extending outwardly from the forward end of the central passage to respective left and right passage inlets proximate to the respective discharge portions of the harvesting units; blower means rigidly connected to the harvesting units directing blasts of air through said inlets and traversing the respective streams of commingled cotton bolls, the blasts of air being of sufficient intensity to drive the ripe bolls from the streams and through the passages to be discharged at the outlet and to permit the green bolls to continue in the streams for ultimate collection in the container means.

6. Cotton conveying and separating means for use with a cotton harvester adapted to be mounted on a tractor to move over a field of row-planted cotton plants, the harvester including: a pair of harvesting units mounted on opposite sides of the tractor and having means therein for indiscriminately and forcibly detaching ripe and green cotton bolls from adjacent rows of cotton plants and conveying the detached bolls rearwardly to respective discharge portions of the harvesting units to depart therefrom in streams of commingled ripe and green cotton bolls, said conveying and separating means comprising: boll receiving containers adjacent to and connected to the discharge portions of the harvester units and positioned to receive the cotton bolls issuing from the streams; housing structure supportable on the tractor and forming discharge ducts having inlets proximate to the discharge portions of the harvesting unit and the streams of commingled cotton bolls and discharge outlets remote from the inlets; blower means connected to the harvester units directing blasts of air through the inlets, the blasts of air being of sufficient intensity to drive the ripe bolls from the streams and through the ducts and to permit the green bolls to continue in the streams for ultimate collection in the containers.

7. The invention defined in claim 6, in which the blower means comprises a pair of transversely spaced blowers fixed to the respective harvesting units; a transversely disposed drive shaft extending between the blowers for driving the blowers, and drive means operative from the main power source for rotating the drive shaft.

8. Cotton conveying and separating means for a cotton harvester having a harvesting unit for detaching cotton bolls from cotton plants receivable in the harvester and including means for conveying the cotton bolls to a discharge portion of the harvesting unit and to depart therefrom in a stream of commingled ripe and green bolls, said conveying and separating means comprising: housing means forming an elongated air passage having an outlet remote from the discharge portion and an inlet proximate to the discharge portion, said housing means also forming a receptacle adjacent the discharge portion positioned to receive the stream of cotton bolls; blower means directing a blast of air through the inlet, the blast of air traversing the stream of commingled cotton bolls and being of sufficient intensity to drive the ripe bolls from the stream and through the air passage to be discharged through the outlet and to permit the green bolls to continue in the stream for ultimate collection in the recepatacle; and means connecting the blower means and the housing means to the harvester.

References Cited in the file of this patent

UNITED STATES PATENTS

| 2,502,817 | Bennett | Apr. 4, 1950 |
| 2,533,510 | Roscoe | Dec. 12, 1950 |
| 2,544,411 | Altgelt | Mar. 6, 1951 |
| 2,645,821 | Fowler | July 21, 1953 |